United States Patent
Huang

(10) Patent No.: US 7,568,296 B2
(45) Date of Patent: Aug. 4, 2009

(54) CONSTRUCTION FOR LOOSING PREVENTION AND POSITION FIXING OF RULE TAPE OF TAPE RULER

(75) Inventor: Jason Huang, Taipei (TW)

(73) Assignee: Index Measuring Tape Co., Ltd., Taipei (TW)

( * ) Notice: Subject to any disclaimer, the term of this patent is extended or adjusted under 35 U.S.C. 154(b) by 0 days.

(21) Appl. No.: 11/866,727

(22) Filed: Oct. 3, 2007

(65) Prior Publication Data

US 2009/0090015 A1    Apr. 9, 2009

(51) Int. Cl.
*G01B 3/10* (2006.01)
(52) U.S. Cl. .............................. 33/761; 33/755; 33/758
(58) Field of Classification Search ................... 33/761, 33/755, 756, 758, 759, 769, DIG. 1
See application file for complete search history.

(56) References Cited

U.S. PATENT DOCUMENTS

| | | | | |
|---|---|---|---|---|
| 421,133 | A * | 2/1890 | Grierson | 33/768 |
| 1,596,407 | A * | 8/1926 | Dingman | 33/770 |
| 2,759,696 | A * | 8/1956 | Nelson | 248/510 |
| 4,189,107 | A * | 2/1980 | Quenot et al. | 242/390.1 |
| 4,228,589 | A * | 10/1980 | Chemay | 33/759 |
| 4,580,347 | A * | 4/1986 | McKnight | 33/760 |
| 5,367,785 | A * | 11/1994 | Benarroch | 33/767 |
| 5,379,524 | A * | 1/1995 | Dawson | 33/768 |
| 6,817,110 | B2 * | 11/2004 | Bohnengel | 33/555.4 |
| 7,415,778 | B1 * | 8/2008 | McEwan et al. | 33/761 |
| 2003/0167651 | A1 * | 9/2003 | Pedersen | 33/758 |

* cited by examiner

*Primary Examiner*—Christopher W Fulton
(74) *Attorney, Agent, or Firm*—Lowe Hauptman Ham & Berner, LLP

(57) ABSTRACT

A construction for position fixing of a rule tape comprises a main housing having a handle formed at its upper end, and a wound rule tape for measurement in the main housing. The free end of said rule tape has a buckle ring with a magnetic adjacent to said buckle, to absorb the generation of a pulling force due to the weight of buckle ring A fixing element is installed in the main housing.

3 Claims, 5 Drawing Sheets

CONSTRUCTION FOR LOOSING PREVENTION AND POSITION FIXING OF RULE TAPE OF TAPE RULER

BACKGROUND OF THE INVENTION

1. Field of the Invention

The present invention relates to a construction for loosing prevention and position fixing of rule tape of tape ruler, especially to a construction for fixing the head portion of the rule tape of tape ruler, so as to enable user to measure a distance of object by himself.

2. Description of Prior Art

As shown in FIG. 1, the conventional manual winding tape ruler comprises a main housing 11, the upper end of said main housing 11 is formed as a handle 12 and a wound rule tape 13 is installed inside the main housing 11. On one side of the main housing 11, there is a winding element 14 for winding the rule tape 13 into the housing 11. The free end of rule tape 13 is attached with a buckle ring 13, so as to enable the user to pull out the rule tape and prevent the free end of the rule tape to be wound into the main housing 11. While in using the tape ruler, the rule tape 13 is pulled out to measure the distance or length of an object by viewing the scales formed on the rule tape 13.

However, when said conventional tape ruler is in using for measuring a distance of object, because the free end of rule tape 13 can not be fixed at a position, the rule tape 13 has to be pulled out by one individual, while another people holds the main housing 11 and hooks the scale indicating the object to obtain the information of measurement. It is difficult for one person to measure an object and as a result, the conventional tape ruler is not convenient for people to measure an object.

Furthermore, the free end of rule tape of said conventional manual winding tape ruler is not fixed at one location and the end of rule tape can swing freely, the weight of buckle attached onto the rule tape always causes the loosing of rule tape, this also causes inconvenience to people.

SUMMARY OF THE INVENTION

In view of the disadvantages happened in conventional tape ruler, it is then an object of present invention to provide a construction for loosing prevention and position fixing of rule tape of tape ruler, such that the disadvantages happened in conventional tape ruler can be dissolved, people then can easily fix the free end of rule tape, and the measurement can be achieved by one people only.

According to the tape ruler of present invention, when the tape ruler is not in use, the buckle ring attached to the free end of rule tape can be located at a fix position, then a pulling force generated due to the weight of buckle ring attached onto the end of rule tape can be prevented, the rule tape of tape ruler then shall not be loosen when the tape ruler is not in use. This is another object of present invention.

According to the object mentioned above, the construction provided in the present invention then comprises a main housing having a handle formed at its upper end, and a wound rule tape is installed in the main housing. On one side of the main housing, there is a winding element having a shaft formed at its inner end located inside the main housing. Said rule tape is wound onto said shaft and there is a rotation portion to be mounted onto the outer end of said winding element, such that the rule tape can be wound into the main housing by rotating said winding element; the free end of said rule tape is attached with a buckle ring, such that the rule tape can be pulled out of tape ruler and the free end of rule tape is prevented from wound into the main housing; there is installed with a magnetic element adjacent to said buckle, so as to absorb said buckle ring be located at a fix position and prevent the generation of pulling force due to the weight of buckle ring, the rule tape then would not be loosen; in addition, there is a fixing element installed in the main housing, in measuring the distance between two objects, the fixing element is taken apart off main housing in advance, and then the fixing element is stuck into a position to be measured, afterwards, the buckle ring at the free end of rule tape is mounted onto the fixing element to fix the end of rule tape at a designated position. Thus the measurement can be achieved by only one people and it is not necessary to hold the end of rule tape by another one when a measurement is performed.

A more complete understanding of these and other features and advantages of the present invention will become apparent from a careful consideration of the following detailed description of preferred embodiments illustrated in the accompanying drawings.

DETAILED DESCRIPTION OF THE PREFERRED EMBODIMENTS

Figure 1:
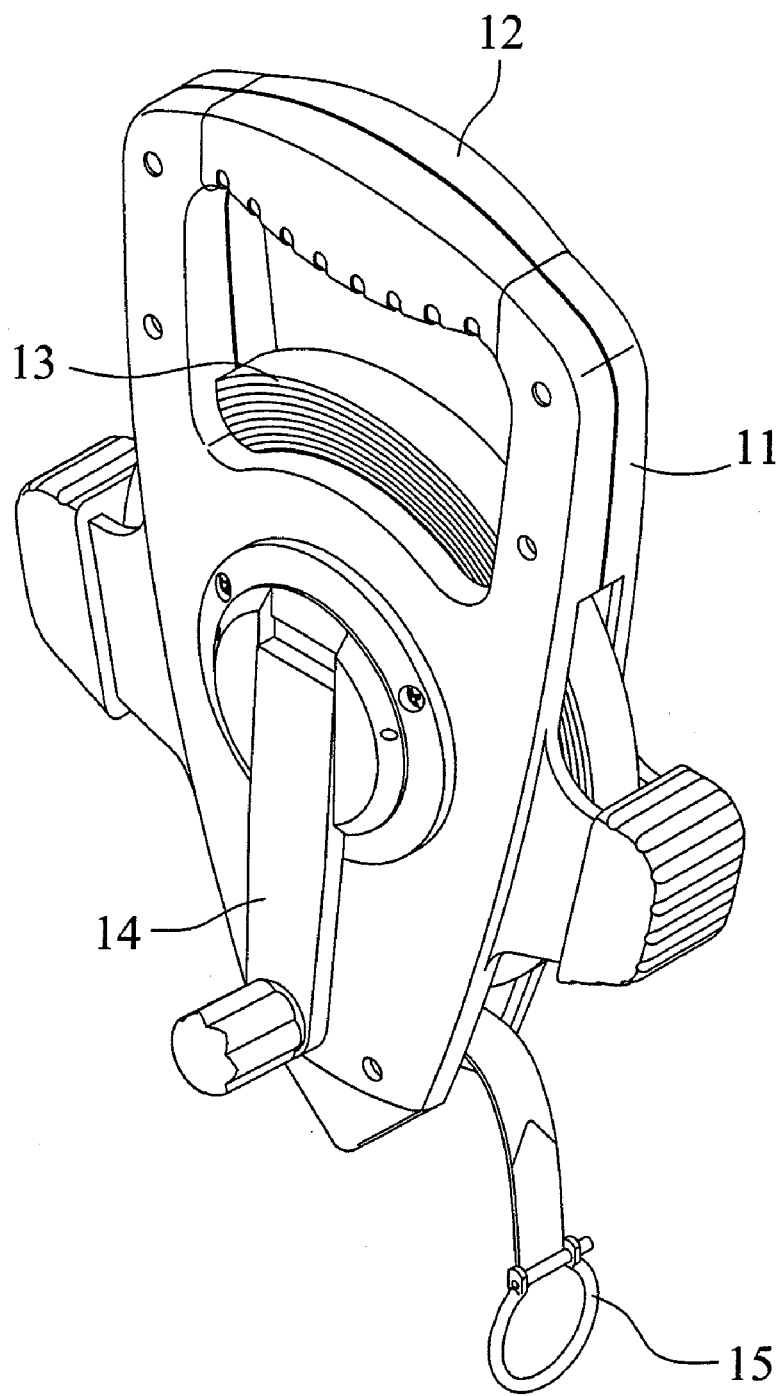
FIG. 1 is a perspective view of conventional tape ruler.
Figure 2:
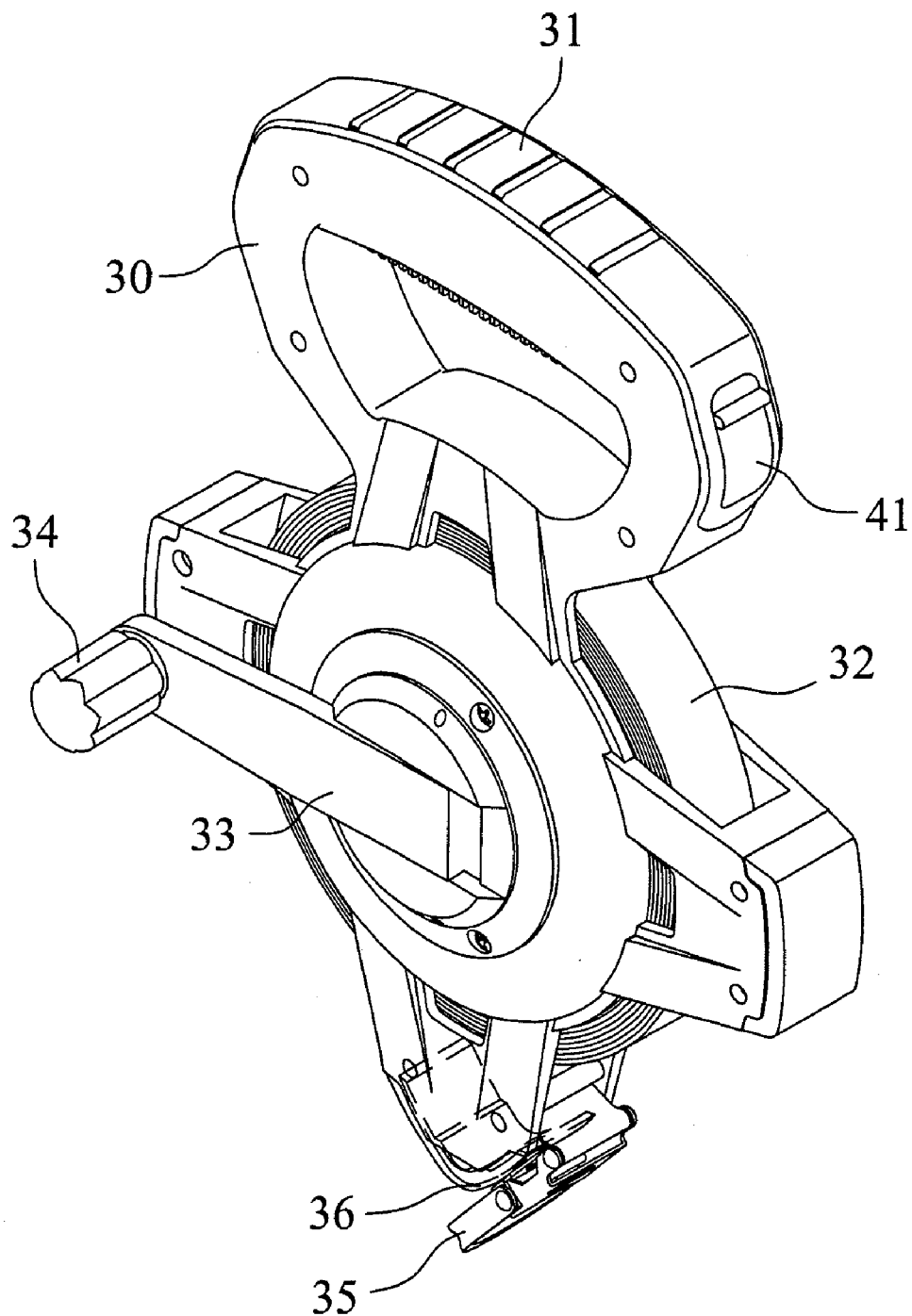
FIG. 2 is a perspective view of the tape ruler of present invention.
Figure 3:
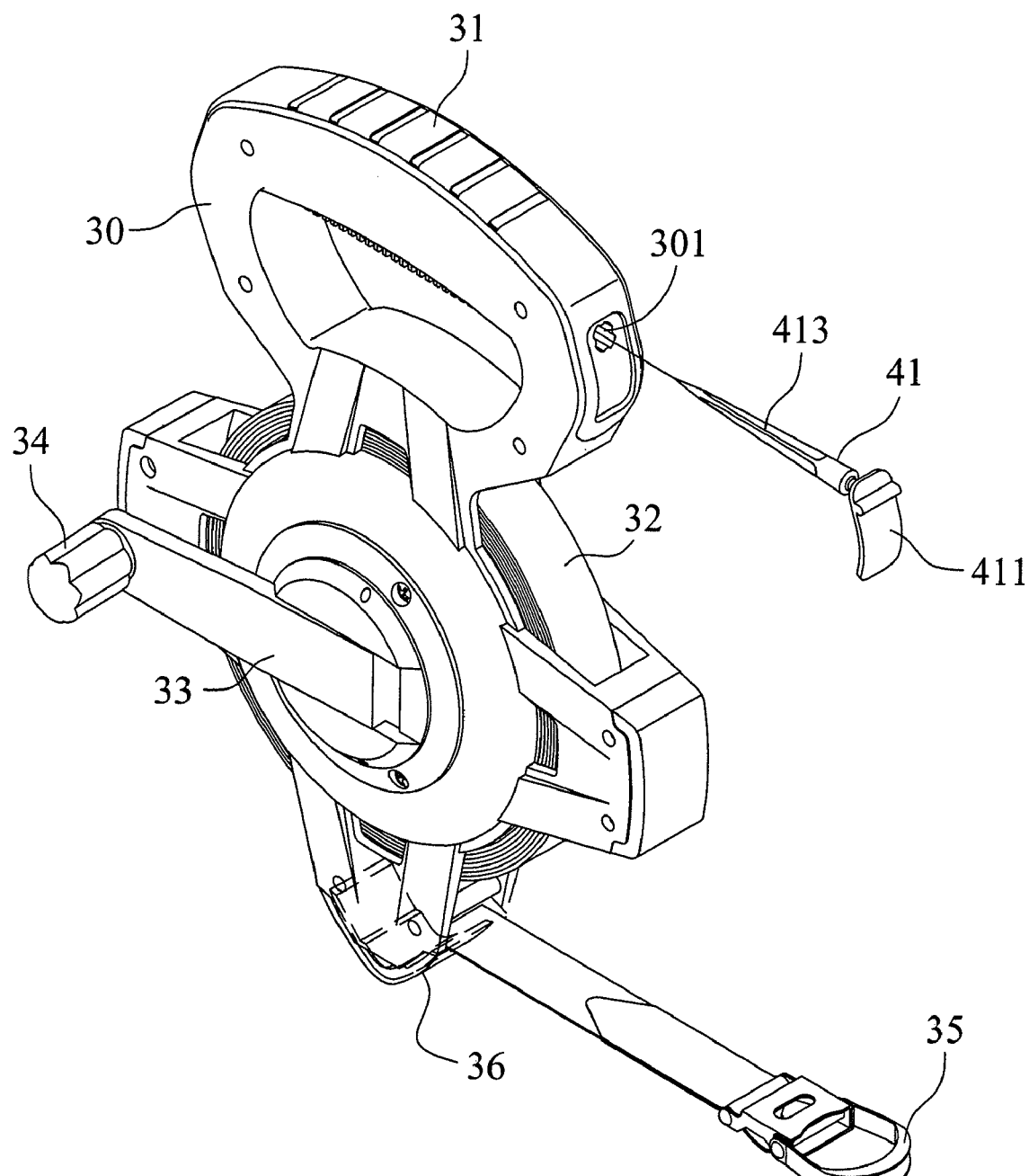
FIG. 3 is a portional exploded perspective view showing the construction of present invention.
Figure 4:
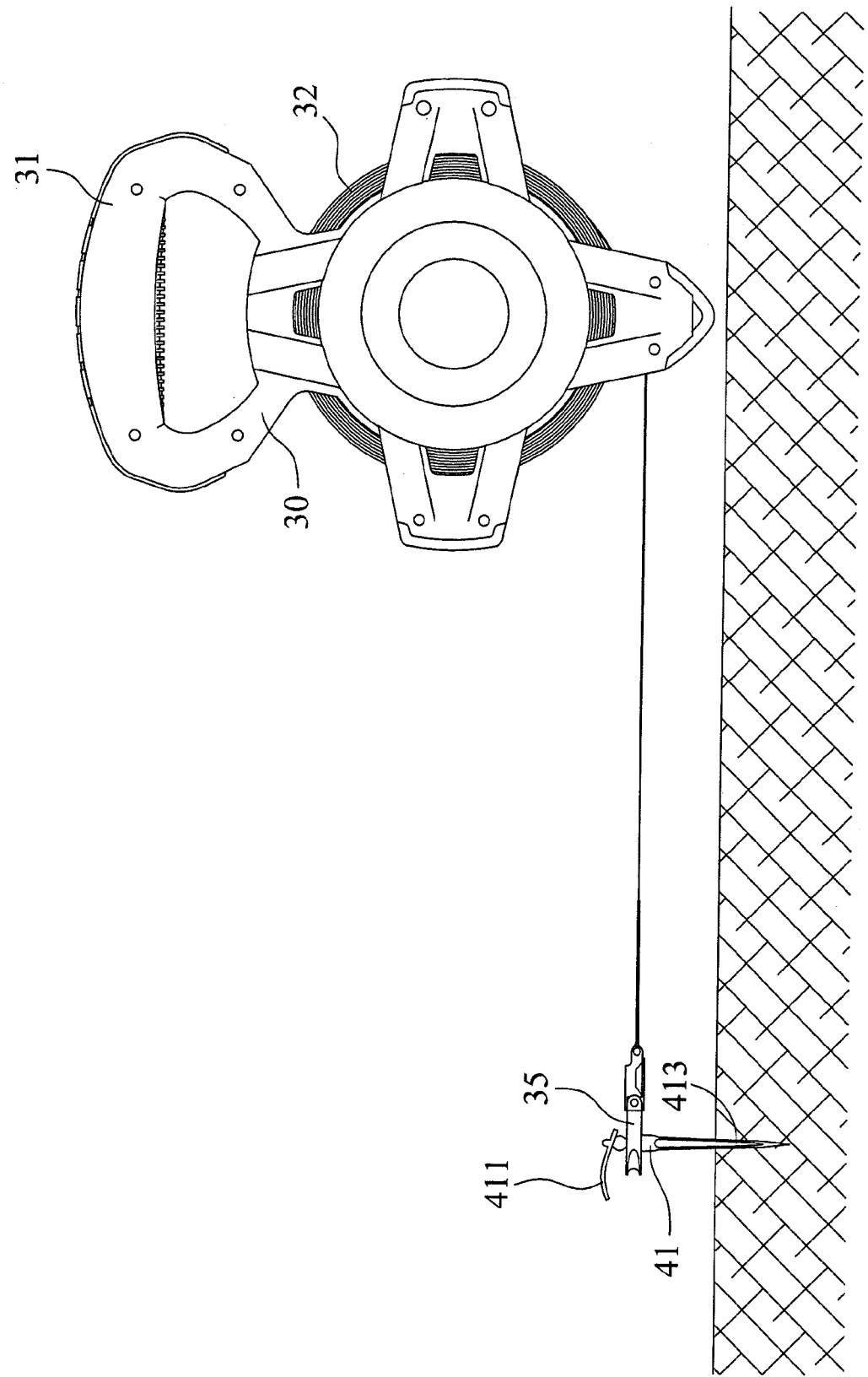
FIG. 4 is view showing the use of present invention.
Figure 5:
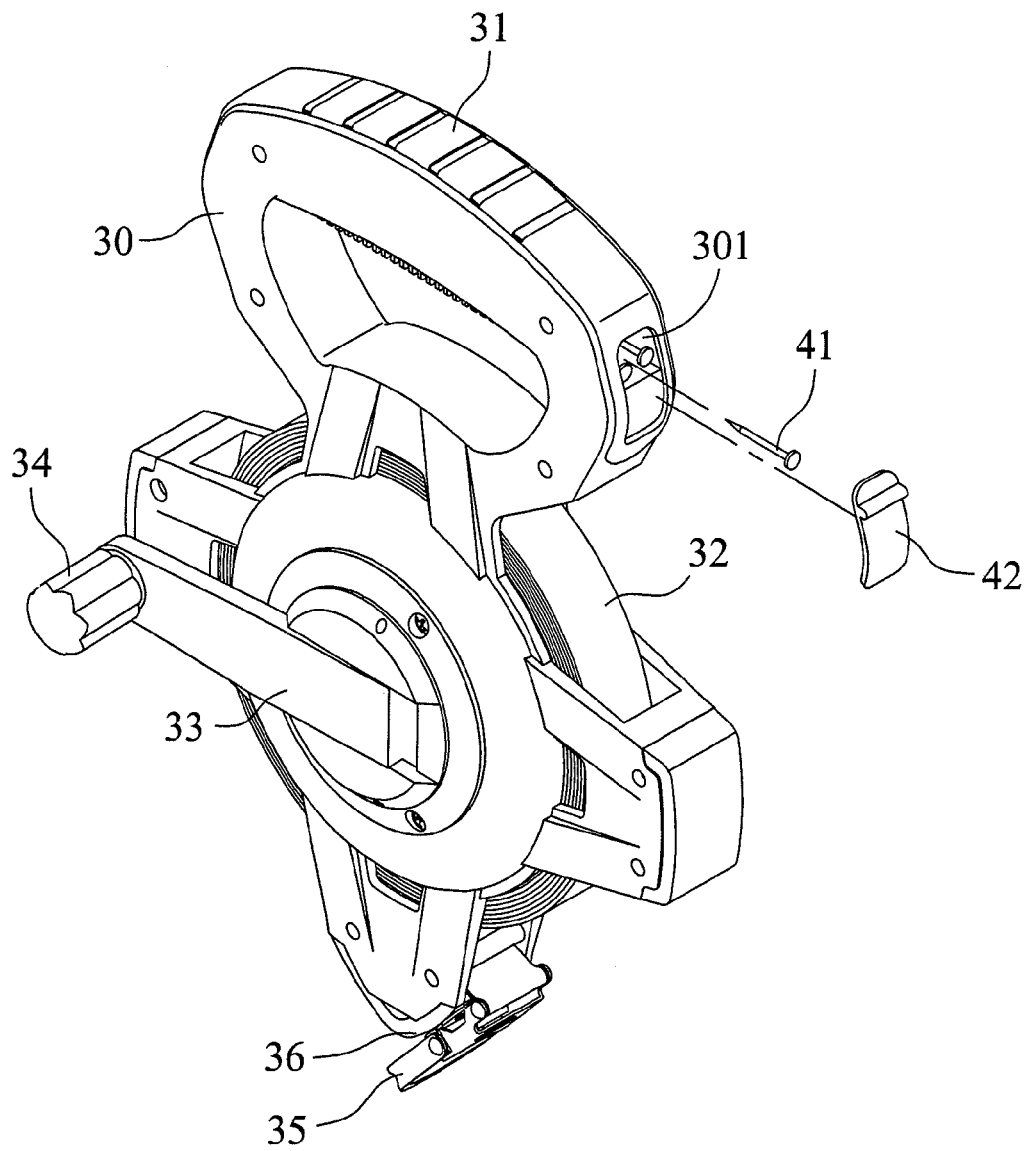
FIG. 5 is another portional exploded perspective view of present invention.

According to the construction for loosing prevention and position fixing of a rule tape of tape ruler of the present invention, as shown in FIGS. 2, 3, 4 & 5, the tape ruler of the present invention includes a main housing 30. The upper end of said main housing 30 is formed as a handle 31 for a person to hold the tape ruler without falling down. A wound rule tape 32 is installed in the main housing 30, and on one side of the main housing 30, there is a winding element 33 having a shaft formed at its inner and located inside the housing 30 for the rule tape 32 to wind on. There is a rotation element 34 to be mounted onto the outer end of said winding element 33, such that a person can hold the rotation portion 34, rotate the winding element 33 and then wind the rule tape 32 into the main housing 30. The free end of said rule tape 32 is firmly attached with a buckle ring 35 preferably made by iron or the same materials, so as to enable a person to pull the rule tape 32 out of the main housing 30 and prevent the free end of rule tape 32 to be wound into the main housing 30. There is also a hollow space 301 formed inside the main housing 30 for holding a fixing element 41.

By the construction shown above, when the tape ruler of present invention is in use for measuring the distance between two objects, the fixing element 41 is first taken apart from the main housing 30, and then it is stuck firmly at the position of one object. After the buckle ring 35 is firmly attached at the end of rule tape 32 it is mounted onto the fixing element 41, by holding the tape ruler and walking to the position of another object, the rule tape 32 then would be pulled out of the main housing 30 for measuring the distance between two objects. The measurement by only one person is then achieved.

Referring to FIGS. 2, 3, 4, & 5 again, there is a magnetic element 36 attached to the main housing 30, preferably, the magnetic element 36 is attached on a portion nearby the buckle ring 35 is firmly attached at the end of rule tape. Such that the buckle ring 35 can be attracted by the magnetic element 36, then a pulling force generated due to the weight of buckle ring attached onto the end of said rule tape is prevented, the rule tape of tape ruler then shall not loosen after being wound into the main housing.

Referring to FIGS. 2, 3, 4 & 5 again, said fixing element 41 can be a pin having a flat end 411, while the other end of the pin is a sharp end 413 for sticking into the position of an object for measurement. Furthermore, the fixing element 41 can be a nail or a bolt etc., and there is a cover 42 attached to the mouth of said hollow space 301 for holding the fixing element 41 inside the main housing.

According to the construction for loosening prevention and position fixing of rule tape of tape ruler of present invention, when the tape ruler is not in use, the buckle ring attached to the free end of rule tape can be located at a fixed position, then a pulling force generated due to the weight of buckle ring attached onto the end of rule tape can be prevented, the rule tape of tape ruler then shall not be loosen when the tape ruler is not in use. In addition, by taking apart the fixing element held inside the main housing, sticking the fixing element at a position corresponding to an object, attaching said buckle ring onto said fixing element, pulling the rule tape out of the main housing to another object, then the distance between two objects can be measured by only one person.

Since the construction of present invention is not disclosed and for sale previously, it is then believed the present invention is an invention of novelty.

Although the present invention has been described with a certain degree of particularity, the present disclosure has been made by way of example and changes in details of structure may be made without departing from the spirit thereof.

What is claimed is:

1. A construction for prevention of loosening and position fixing of one end of a tape ruler, comprising:
    a main housing having a handle portion disposed above said main housing and fixed thereto for a person to hold;
    a wound extractable rule tape having a free end installed in said main housing below said handle portion, and a winding element and a shaft formed at an inner end of said winding element inside of said main housing for said rule tape to be wound on;
    a buckle ring firmly attached to the free end of said rule tape;
    characterized in that: said buckle ring is made of a material that is attracted by magnetic force, and a magnetic element is attached to a portion of said main housing near the free end of said rule tape for said buckle ring to be firmly attached thereto; and
    wherein said handle portion includes a hollow space and a removable fixing element disposed in said hollow space and a cover for covering said hollow space in said handle portion fixed to one end of said fixing element.

2. The construction for prevention of loosening and position fixing of one end of a tape ruler according to claim 1, wherein said fixing element is a nail having a sharp end and a flat end.

3. The construction for prevention of loosening and position fixing of one end of a tape ruler according to claim 1, wherein the said fixing element is a bolt.

* * * * *